United States Patent
Higuchi

(10) Patent No.: US 8,030,874 B2
(45) Date of Patent: Oct. 4, 2011

(54) POWER CONVERTING APPARATUS

(75) Inventor: Yutaka Higuchi, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 534 days.

(21) Appl. No.: 12/278,895

(22) PCT Filed: Jul. 26, 2007

(86) PCT No.: PCT/JP2007/064683
§ 371 (c)(1),
(2), (4) Date: Aug. 8, 2008

(87) PCT Pub. No.: WO2009/013835
PCT Pub. Date: Jan. 29, 2009

(65) Prior Publication Data
US 2010/0164418 A1    Jul. 1, 2010

(51) Int. Cl.
*H02P 27/08* (2006.01)
(52) U.S. Cl. .................. 318/599; 318/448; 318/629
(58) Field of Classification Search .............. 318/599, 318/400.23, 400.24, 400.25, 400.26, 400.27, 318/400.28, 448, 629; 363/39–48, 95–98, 363/131–139
See application file for complete search history.

(56) References Cited

U.S. PATENT DOCUMENTS 3,916,285 A * 10/1975 Iwata et al. ............... 363/41
4,635,177 A *  1/1987 Shekhawat et al. ....... 363/41

FOREIGN PATENT DOCUMENTS

JP      05-130792 A    5/1993
JP      06-253546 A    9/1994

OTHER PUBLICATIONS

Hideki Iida et al., "Instruction to inverter-controlled electric locomotive," Denkisyakenkyukai, 2003, printed in Japan (translation of article).
PCT/ISA/210 (in Japanese).
PCT/ISA/237 (in Japanese).

* cited by examiner

*Primary Examiner* — Bentsu Ro
(74) *Attorney, Agent, or Firm* — Buchanan Ingersoll & Rooney PC

(57) ABSTRACT

To reduce, in a power converting apparatus for an electric locomotive, a sixth-order harmonic noise induced by a torque ripple component equivalent to a sixth-order frequency of an inverter frequency. When a motor is driven in a three-pulse mode to drive the electric locomotive, three pulses included within a ½ cycle of the inverter frequency in a PWM waveform, which is used for controlling a switching element of an inverter unit that drives the motor, are set to satisfy $Tq \geq T/8$, $Tp \leq Tq/2$, and $Tr \leq Tq/2$ where, assuming that the three pulses include a first pulse, a second pulse, and a third pulse from an order of generation, Tp is a pulse width of the first pulse, Tq is ½ of a pulse width (full width at half maximum of a pulse) of the second pulse, Tr is a pulse width of the third pulse, and T is a cycle of the inverter frequency.

4 Claims, 4 Drawing Sheets

POWER CONVERTING APPARATUS

TECHNICAL FIELD

The present invention relates to a power converting apparatus (inverter) for an electric locomotive, more particularly, to a power converting apparatus capable of effectively reducing sixth-order harmonic noise induced by a harmonic current that is generated when the electric locomotive is driven by inverter modulation method (hereinafter, "sixth-order harmonic noise").

BACKGROUND ART

Non-patent document 1 discloses a conventional inverter modulation method for driving an electric locomotive. In the inverter modulation method disclosed in Non-patent document 1 multi-pulse asynchronous modulation is used when inverter frequency is low, three-pulse synchronous modulation is used when the inverter frequency increases to a predetermined level, and single-pulse synchronous modulation is used when or after the output voltage reaches a termination voltage (rated output: 100%).

Non-patent document 1: "Instruction to inverter-controlled electric locomotive" Hideki Iida, Atsushi Kaga, Denkisyakenkyukai

DISCLOSURE OF INVENTION

Problem to Be Solved by the Invention

However, in the above-described conventional inverter modulation method, when the synchronous modulation is performed, especially when the three-pulse synchronous modulation or the single-pulse synchronous modulation at the output voltage being about the terminal voltage is performed, a torque ripple component equivalent to a sixth-order frequency that is generated by a fifth-order harmonic current and a seventh-order harmonic current included in a current waveform may resonate with structures of the locomotive body leading to generation of a big noise.

The present invention has been achieved to solve the above problems and it is an object of the present invention to provide a power converting apparatus that can reduce the sixth-order harmonic noise that is induced by the torque ripple component equivalent to the sixth-order frequency of the inverter frequency by suppressing the torque ripple component.

Means for Solving Problem

To solve the above problems, and to achieve the above objects, a power converting apparatus according to the present invention includes an input-circuit unit that receives an input voltage that is either a direct-current voltage or an alternating-current voltage, and converts the input voltage to a direct-current voltage; an inverter unit that converts the direct-current voltage from the input-circuit unit to an alternating-current voltage with a predetermined frequency for driving an alternating-current motor; and a PWM-waveform generating unit that generates a PWM waveform for controlling switching of a switching element provided in the inverter unit and outputs the PWM waveform, wherein when the alternating-current motor is to be driven in a three-pulse mode, three pulses included within a ½ cycle of an inverter frequency in the PWM waveform that is output by the PWM-waveform generating unit are set to satisfy $Tq \geq T/8$, $Tp \leq Tq/2$, and $Tr \leq Tq/2$ where, the three pulses include a first pulse, a second pulse, and a third pulse from an order of generation, Tp is a pulse width of the first pulse, Tq is a half of a pulse width (full width at half maximum of a pulse) of the second pulse, Tr is a pulse width of the third pulse, and T is a cycle of the inverter frequency.

Effect of the Invention

A power converting apparatus according to the present invention can suppress a torque ripple component equivalent to a sixth-order frequency of an inverter frequency because three pulses included within a ½ cycle of the inverter frequency in a PWM waveform, which is used for controlling an inverter unit to drive an alternating-current motor in a three-pulse mode, are set to satisfy $Tq \geq T/8$, $Tp \leq Tq/2$, and $Tr \leq Tq/2$ Where, assuming that the three pulses include a first pulse, a second pulse, and a third pulse from an order of generation, Tp is a pulse width of the first pulse, Tq is a half of a pulse width (full width at half maximum of a pulse) of the second pulse, Tr is a pulse width of the third pulse, and T is a cycle of the inverter frequency. This brings an effect of reducing a sixth-order harmonic noise induced by the torque ripple component.

EXPLANATIONS OF LETTERS OR NUMERALS

Figure 1:
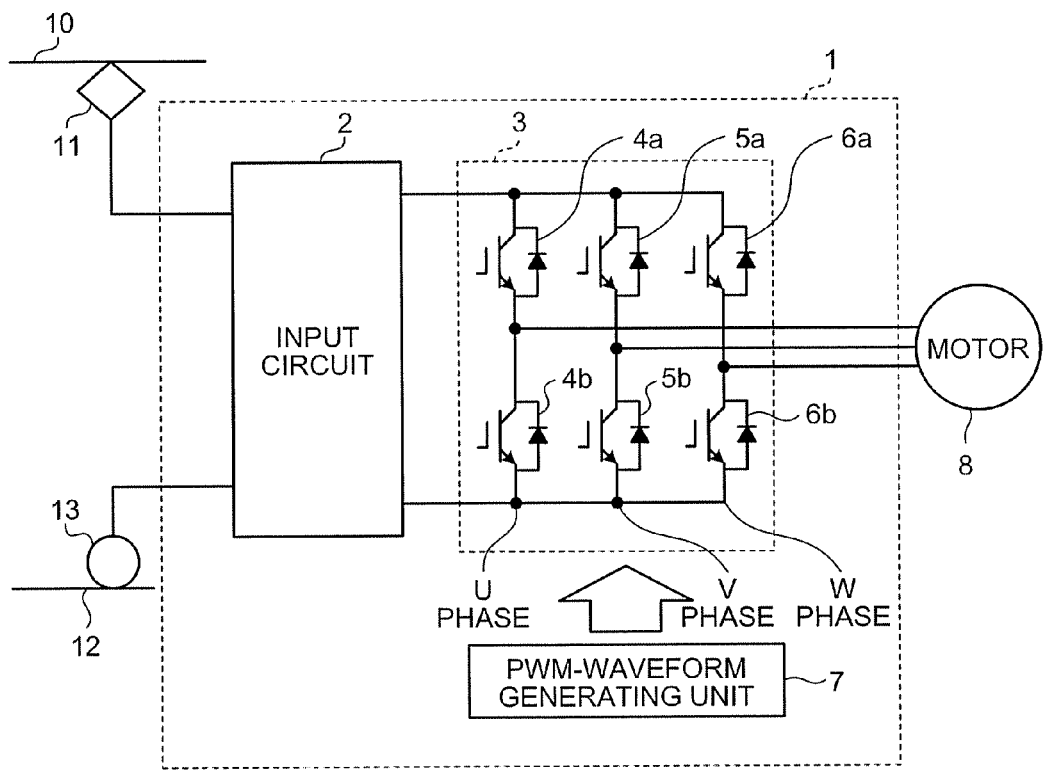
FIG. 1 is a diagram for explaining a structural example of a power converting apparatus according to an embodiment of the present invention.

1 Power converting apparatus
2 Input circuit
3 Inverter unit
4a, 5a, 6a, 4b, 5b, 6b Switching element
7 PWM-waveform generating unit
8 Motor
10 Overhead line
11 Pantograph
12 Rail
13 Wheel

BEST MODE(S) FOR CARRYING OUT THE INVENTION

Exemplary embodiments of a power converting apparatus according to the present invention are described in detail below with reference to the accompanying drawings. The present invention is not limited to these exemplary embodiments.

(Structure of Power Converting Apparatus)

FIG. 1 is a diagram for explaining a structural example of a power converting apparatus according to an embodiment of the present invention. As shown in the figure, a power converting apparatus 1 of the present embodiment includes an input circuit 2 that at least includes a switch, a filter condenser, and a filter reactor; an inverter unit 3 that includes switching elements 4a, 5a, 6a, 4b, 5b, and 6b, and that is connected to at least one motor 8 for driving an electric locomotive; and a PWM-waveform generating unit 7 that generates and outputs a PWM waveform for controlling switching of the inverter unit 3. An induction motor or a synchronous motor is suitable as the motor 8 connected to the inverter unit 3.

As shown in FIG. 1, a first end of the input circuit 2 is connected to an overhead line 10 via a pantograph 11, and a second end is connected to a rail 12 as an earth potential via a wheel 13. A direct-current power or an alternating-current power supplied via the overhead line 10 and the pantograph 11 is input to the first end of the input circuit 2, and a power generated at an output end of the input circuit 2 is input to the inverter unit 3.

The inverter unit 3 includes legs via which a positive-side arm formed with the switching elements 4a, 5a, and 6a (e.g., 4a in U phase) and a negative-side arm formed with the switching elements 4b, 5b, and 6b (e.g., 4b in U phase) are serially connected to each other. That is, the inverter unit 3 includes a three-phase bridge circuit with three pairs of legs (for U phase, V phase, and W phase). An IGBT element or an IPM element including a built-in antiparallel diode is suitable as the switching elements 4a, 5a, 6a, 4b, 5b, and 6b.

The inverter unit 3 converts the direct-current voltage received from the input circuit 2 into a desired alternating-current voltage by PWM-controlling the switching elements 4a, 5a, 6a, 4b, 5b, and 6b based on a switching signal (PWM waveform) received from the PWM-waveform generating unit 7, and outputs the desired alternating-current voltage to the motor 8. Although three legs (three phases) are shown in the structural example shown in FIG. 1, the number of legs is not limited to three.

(Switching Waveform in Conventional Technology)

Figure 2:
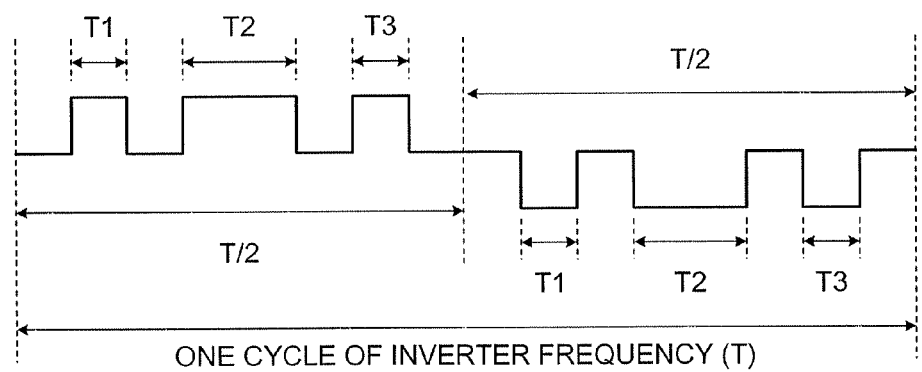
FIG. 2 is a diagram for explaining a switching waveform (line-voltage waveform) generated in a conventional three-pulse mode.

FIG. 2 is a diagram for explaining a switching waveform (line-voltage waveform) generated in a three-pulse mode in a conventional technology (hereinafter, "conventional three-pulse mode"). The voltage waveform shown in the figure can represent any one of line-voltage waveforms U-V phases, V-W phases, and W-U phases.

As shown in FIG. 2, three pulses with pulse widths of T1, T2, and T3 (hereinafter, referred to as "first pulse", "second pulse", and "third pulse", respectively) are generated in the line-voltage waveform of the conventional three-pulse mode within an interval of a ½ cycle (T/2) of the inverter frequency. Those pulses satisfy conditions of T1<T2, T3<T2. The first pulse and the third pulse are generally set to T1=T3 from a viewpoint of a symmetric property of waveform. Current characteristics and torque characteristics in the conventional three-pulse mode will be described later.

(Switching Waveform in the Present Embodiment)

Figure 3:
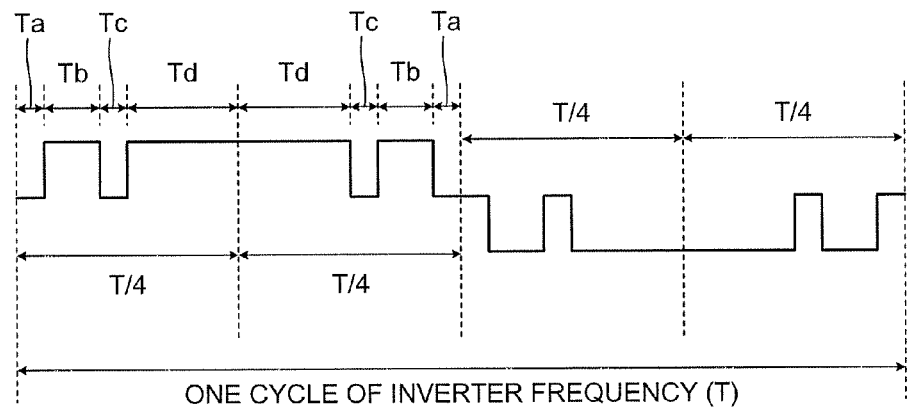
FIG. 3 is a diagram for explaining a switching waveform (line-voltage waveform) generated in an improved three-pulse mode used in the power converting apparatus according to the present embodiment.

FIG. 3 is a diagram for explaining a switching waveform (line-voltage waveform) generated in an improved three-pulse mode used in the power converting apparatus according to the present embodiment (hereinafter, "improved three-phase pulse mode"). The waveform shown in FIG. 3 is separated into intervals of ¼ cycles (T/4), which is half of the ½ cycle (T/2) of the inverter frequency.

In the switching waveform (line-voltage waveform) generated in the improved three-pulse mode shown in FIG. 3, a pulse with a pulse width of Tb is output between pulse pause periods Ta and Tc, and another pulse with a pulse width Td is output after the pulse pause period Tc within an interval of the ¼ cycle of the inverter frequency. Another set of these pulses is generated within the next interval of the ¼ cycle in a symmetric manner with respect to a line between the two intervals. After that, pulses corresponding to the pulses output within the last interval of the ½ cycle are formed in a point symmetric manner within a subsequent interval of the ½ cycle. In other words, the improved three-pulse mode in the present embodiment outputs a switching waveform (line-voltage waveform) including three pulses, i.e., a first pulse having the pulse width of Tb, a second pulse having the pulse width of 2Td, and a third pulse having the pulse width of Tb.

In the improved three-pulse mode, as shown in FIG. 3 from a viewpoint of the symmetric property of waveform, the pulse width of the first pulse and the pulse width of the third pulse are set to equal. However, if later-described Inequalities are satisfied, these pulse widths can be set to unequal.

Given below is an explanation about relations between the pulse pause periods Ta, Tc and the pulse widths Tb, Td that characterize the improved three-pulse mode shown in FIG. 3.

The pulse width Td, the pulse width Tb, and the cycle T of the inverter frequency preferably satisfy:

$$Td \geq T/8 \quad (1)$$

$$Tb \leq Td/2 \quad (2)$$

The pulse width Td is required to satisfy following Inequality as a requirement for forming the improved three-pulse mode:

$$Td < T/4 - Tb \quad (3)$$

Following Inequality can be obtained from Inequalities (1) to (3):

$$T/8 \leq Td < T/4 - Tb \quad (4)$$

Typical examples are described below. For example, if Tb=T/12 is set as Tb satisfying above Inequality (2), above Inequality (4) is transformed as follows:

$$T/8 \leq Td < T/6 \quad (5)$$

Therefore, Td=T/8 or Td=T/7, for example, can be taken as Td satisfying Inequality (5).

If Tb=T/20 is set as Tb satisfying above Inequality (2), above Inequality (4) is transformed as follows:

$$T/8 \leq Td < T/5 \quad (6)$$

In this case, it is possible to take another value such as Td=T/6.

(Operation of Power Converting Apparatus)

Given below is an explanation about the operation of the power converting apparatus according to the present embodiment with reference to FIGS. 1 and 3. As shown in FIG. 1, the direct-current power or the alternating-current power is input via the overhead line 10 and the pantograph 11 to the input circuit 2, and the direct-current power generated at the output terminal of the input circuit 2 is input to the inverter unit 3. The switching elements 4a, 5a, 6a, 4b, 5b, and 6b forming the inverter unit 3 receive a switching signal from the PWM-waveform generating unit 7, and thereby line voltages appear between output terminals of the inverter unit 3 (U-V phases, V-W phases, and W-U phases) and the voltage is applied to the motor 8.

In the conventional inverter control, multi-pulse asynchronous modulation is performed when the inverter frequency is low, three-pulse synchronous modulation is performed when the inverter frequency increases to a predetermined level, and single-pulse synchronous modulation is performed when the output voltage reaches the terminal voltage.

On the other hand, in the inverter control in the present embodiment, although the multi-pulse asynchronous modulation is used when the inverter frequency is low, the PWM waveform as shown in FIG. 3 generated by using the improved three-pulse mode is used when the inverter frequency increases to a predetermined level. The PWM waveform using the improved three-pulse mode is generated by the PWM-waveform generating unit 7. Moreover, the inverter control in the present embodiment does not use the single-pulse mode, which is used in the conventional inverter control. It means that in the inverter control of the present embodiment, a control using the PWM waveform by using the improved three-pulse mode is performed after the output voltage reaches the terminal voltage.

In the inverter control in the present embodiment, it is unnecessary to take torque fluctuations generated, for example, at switching between the three-pulse mode and the single-pulse mode into account because the single-pulse mode is not used.

In the conventional inverter control, it is impossible to perform PWM-waveform change after the output voltage reaches the terminal voltage (rated output) because the control is performed in the single-pulse mode, which makes flexible driving control impossible. On the other hand, the inverter control in the present embodiment obtains an effect of maintaining the flexible driving control even after the output voltage reaches the terminal voltage because the improved three-pulse mode capable of performing a PWM-waveform change is continued.

Figure 4:
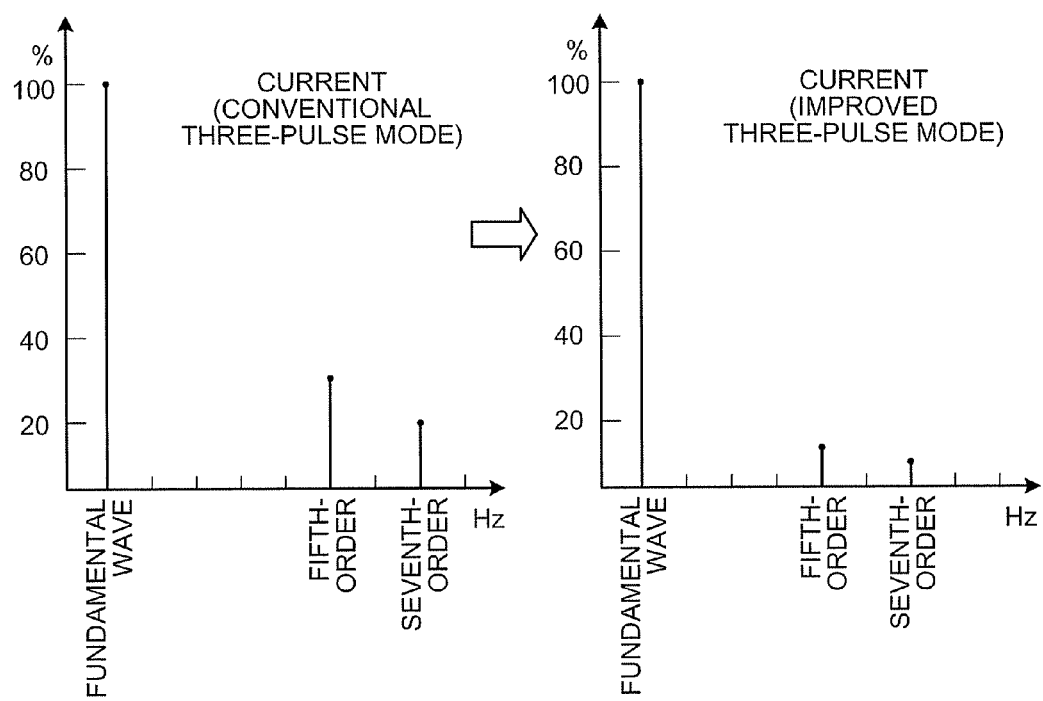
FIG. 4 is a diagram for explaining a harmonic-current reduction effect by the improved three-pulse mode compared with the conventional three-pulse mode.
Figure 5:
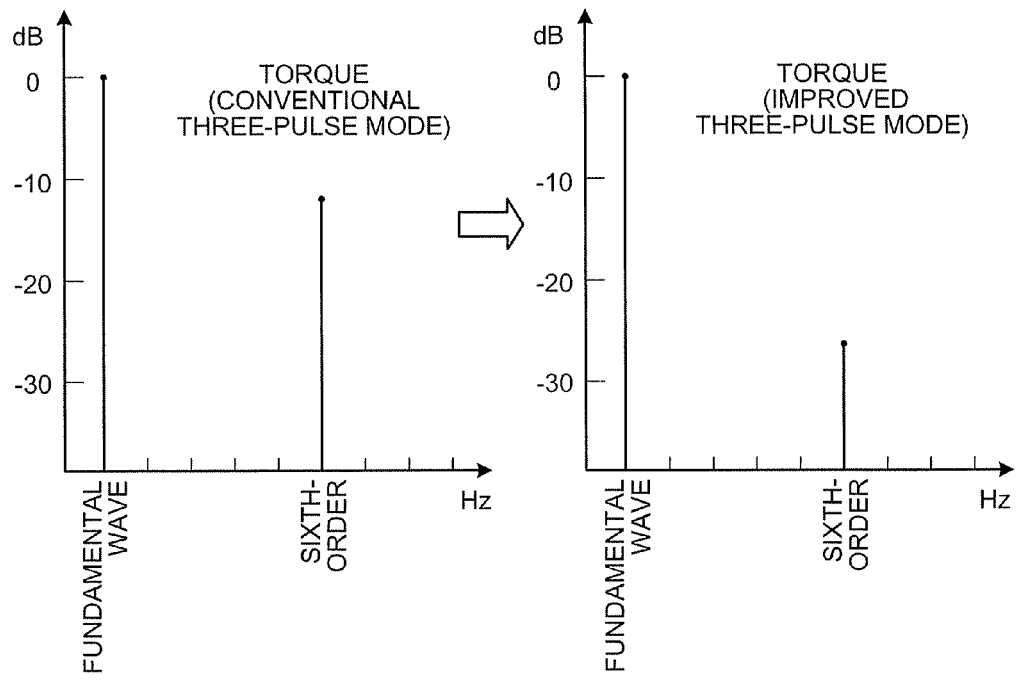
FIG. 5 is a diagram for explaining a harmonic-torque component reduction effect by the improved three-pulse mode compared with the conventional three-pulse mode.
Figure 6:
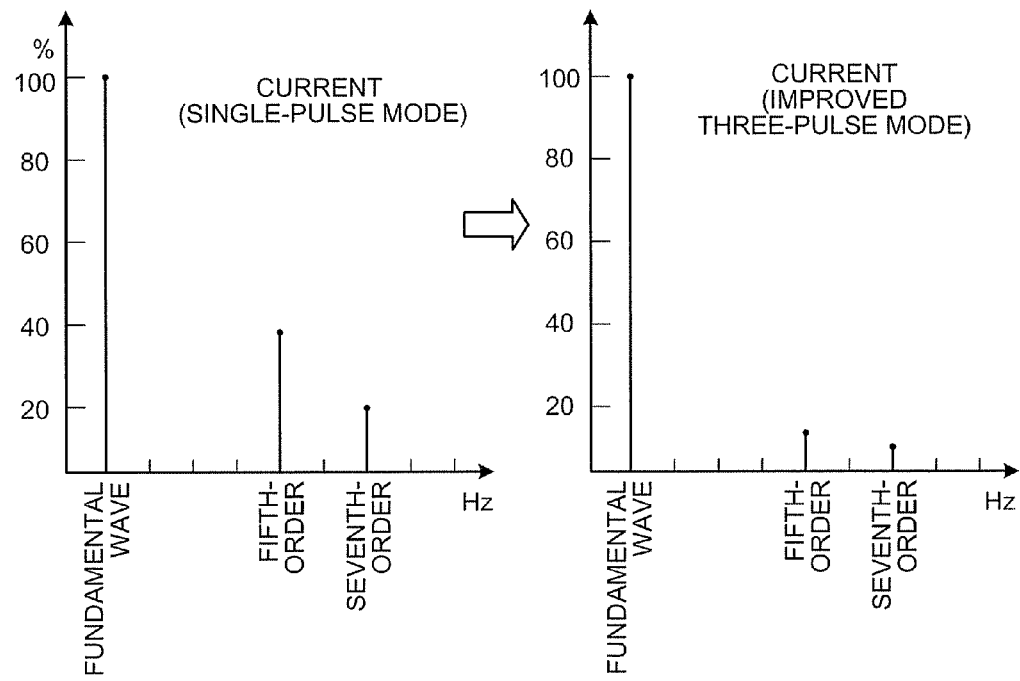
FIG. 6 is a diagram for explaining a harmonic-current reduction effect by the improved three-pulse mode compared with a single-pulse mode.
Figure 7:
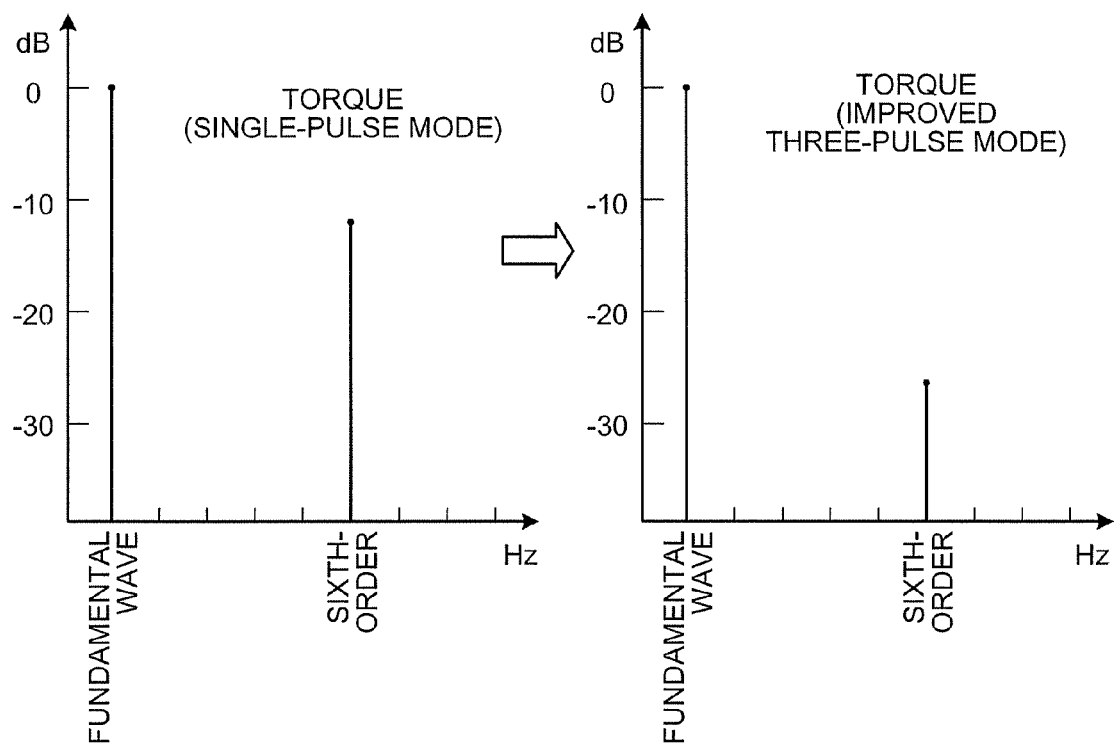
FIG. 7 is a diagram for explaining a harmonic-torque component reduction effect by the improved three-pulse mode compared with the single-pulse mode.

Given below is an explanation about effects by the power converting apparatus according to the present embodiment with reference to FIGS. 4 to 7. FIG. 4 is a diagram for explaining a harmonic-current reduction effect by the improved three-pulse mode compared with the conventional three-pulse mode; FIG. 5 is a diagram for explaining a harmonic-torque component reduction effect by the improved three-pulse mode compared with the conventional three-pulse mode; FIG. 6 is a diagram for explaining a harmonic-current reduction effect by the improved three-pulse mode compared with a single-pulse mode; and FIG. 7 is a diagram for explaining a harmonic-torque component reduction effect by the improved three-pulse mode compared with the single-pulse mode.

As described above, or as has been widely known, the PWM waveform used in the three-pulse or single-pulse synchronous modulation includes, assuming that the inverter frequency is fundamental (first) frequency, a fifth-order harmonic current and a seventh-order harmonic current. Additionally, a torque ripple component equivalent to a sixth-order harmonic is induced by the fifth-order harmonic current and the seventh-order harmonic current.

As shown in the left graph of FIG. 4, if the fundamental wave is 100%, 30% or a little larger of the fifth-order harmonic current and about 20% of the seventh-order harmonic current are generated in the conventional three-pulse mode. As shown in the left graph of FIG. 5, if the fundamental wave is 0 dB, about −12 dB of the sixth-order torque ripple component is generated.

On the other hand, in the improved three-pulse mode according to the present embodiment, the fifth-order harmonic current and the seventh-order harmonic current decrease to a little less than 15% and a little less than 10%, respectively as shown in the right graph of FIG. 4. As a result, as shown in the right graph of FIG. 5, the sixth-order torque ripple component decreases to about −25 dB, i.e., lower than that in the conventional model by 13 dB (about ½₀ as large as that in the conventional model).

As shown in the left graph of FIG. 6, if the fundamental wave is 100%, 40% or a little larger of the fifth-order harmonic current and 20% or a little larger of the seventh-order harmonic current are generated in the single-pulse mode. As shown in the left graph of FIG. 7, if the fundamental wave is 0 dB, about −12 dB of the sixth-order torque ripple component is generated. It means that the sixth-order torque ripple component in the improved three-pulse mode according to the present embodiment is lower than that in the single-pulse mode by about 13 dB (about ½₀ as large as that in the single-pulse mode).

As described above, the power converting apparatus according to the present embodiment performs the multi-pulse asynchronous modulation when the inverter frequency is low, and use, when the inverter frequency increases to a predetermined level, the PWM waveform based on the improved three-pulse mode obtained by changing a temporal distribution of the PWM waveform in the conventional three-pulse mode. This allows suppressing the torque ripple component equivalent to the sixth-order frequency of the inverter frequency and reducing the sixth-order harmonic noise induced by the torque ripple component.

Moreover, the power converting apparatus of the present embodiment can perform a control regardless of the torque fluctuations generated at switching between the three-pulse mode and the single-pulse mode, because the power converting apparatus does not use the single-pulse mode. This makes it possible to simplifying the control configuration or the control modes.

INDUSTRIAL APPLICABILITY

As set forth hereinabove, a power converting apparatus according to the present invention is suitable as an invention capable of reducing the sixth-order harmonic noise induced by the torque ripple component equivalent to the sixth-order frequency of the inverter frequency.

The invention claimed is:

1. A power converting apparatus comprising:
   an input-circuit unit that receives an input voltage that is either a direct-current voltage or an alternating-current voltage, and converts the input voltage to a direct-current voltage;
   an inverter unit that converts the direct-current voltage from the input-circuit unit to an alternating-current voltage with a predetermined frequency for driving an alternating-current motor; and
   a PWM-waveform generating unit that generates a PWM waveform for controlling switching of a switching element in the inverter unit and outputs the PWM waveform, wherein
   when the alternating-current motor is to be driven in a three-pulse mode, three pulses included within a ½ cycle of an inverter frequency in the PWM waveform that is output by the PWM-waveform generating unit are set to satisfy $Tq \geq T/8$, $Tp \leq Tq/2$, and $Tr \leq Tq/2$ where, the three pulses include a first pulse, a second pulse, and a third pulse from an order of generation, Tp is a pulse width of the first pulse, Tq is a half of a pulse width (full width at half maximum of a pulse) of the second pulse, Tr is a pulse width of the third pulse, and T is a cycle of the inverter frequency.

2. The power converting apparatus according to claim 1, wherein the pulse width Tp of the first pulse and the pulse width Tr of the third pulse are set to satisfy Tp=Tr.

3. The power converting apparatus according to claim 1 wherein the alternating-current motor is driven in the three-pulse mode even after output voltage of the inverter unit reaches a terminal voltage.

4. The power converting apparatus according to claim 2, wherein the alternating-current motor is driven in the three-pulse mode even after output voltage of the inverter unit reaches a terminal voltage.

* * * * *